July 24, 1951 H. G. LYKKEN ET AL 2,561,388
CLASSIFIER UNITS FOR FRIABLE MATERIAL PULVERIZERS
Filed Aug. 20, 1945 5 Sheets-Sheet 1

INVENTORS
HENRY G. LYKKEN
WILLIAM H. LYKKEN
BY M. Theodore Simmons
ATTORNEY

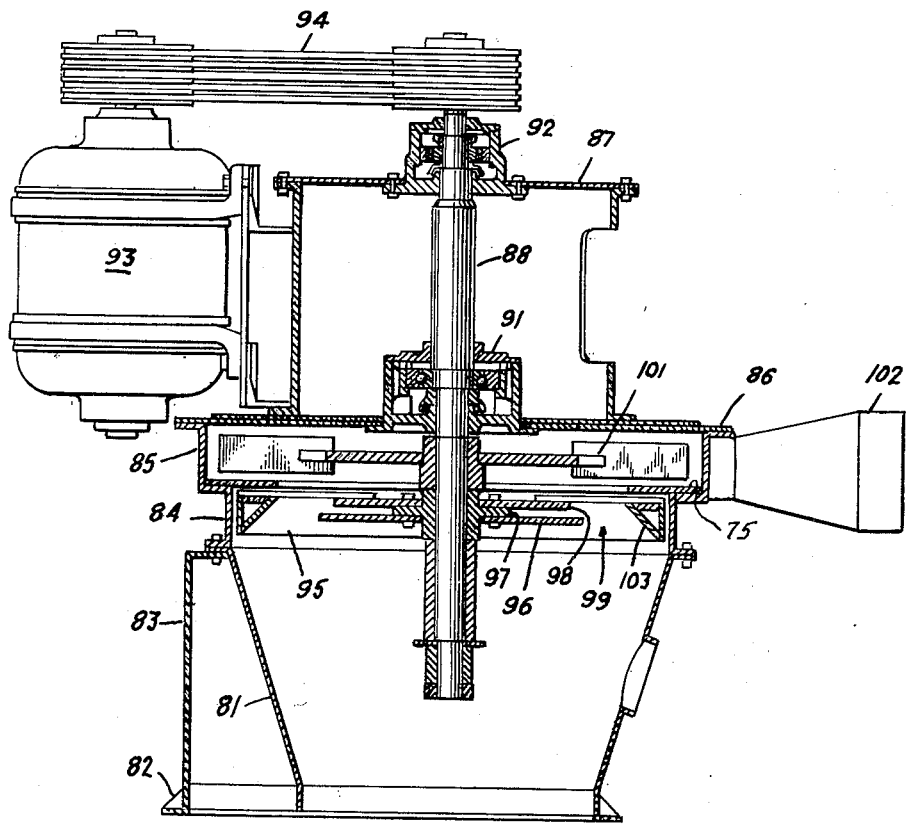
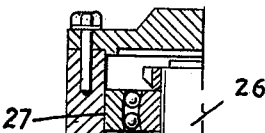
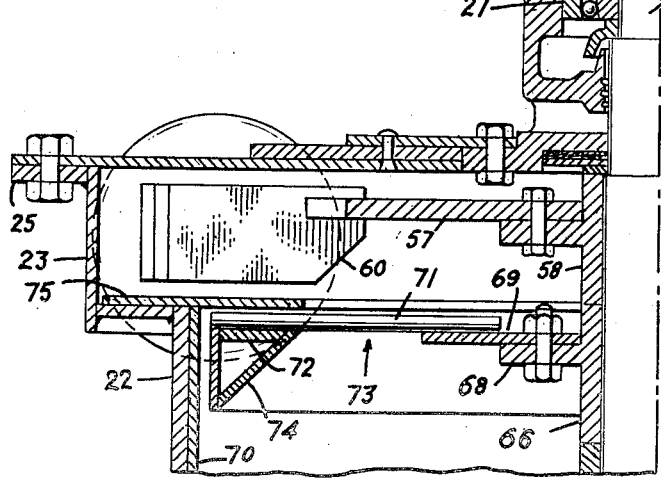

July 24, 1951   H. G. LYKKEN ET AL   2,561,388
CLASSIFIER UNITS FOR FRIABLE MATERIAL PULVERIZERS
Filed Aug. 20, 1945   5 Sheets-Sheet 3
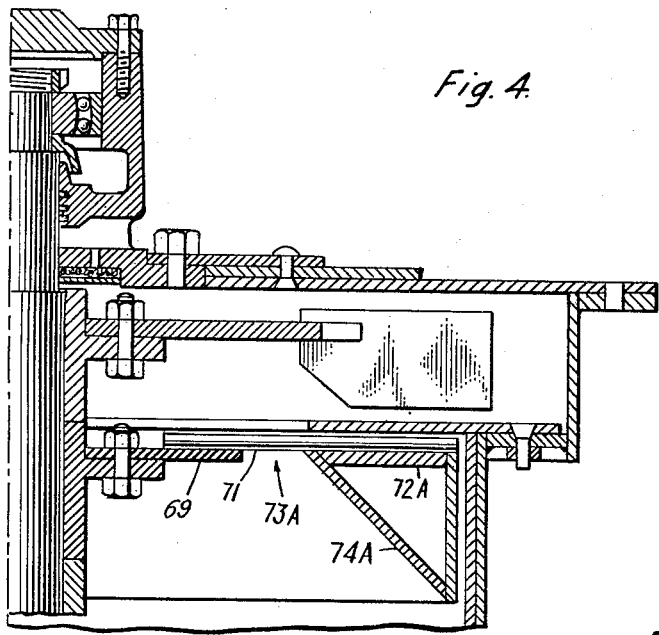
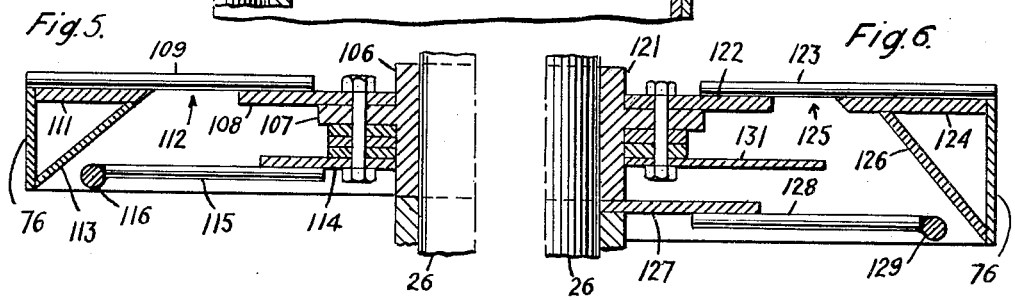
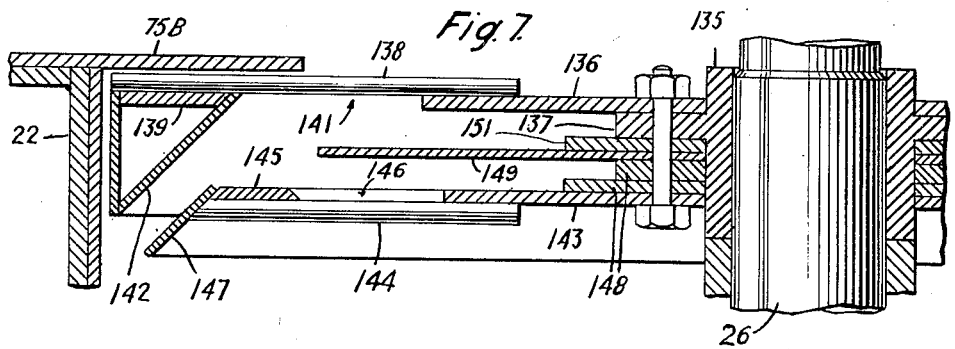
INVENTORS
HENRY G. LYKKEN
WILLIAM H. LYKKEN
BY Theodore Simmons
ATTORNEY

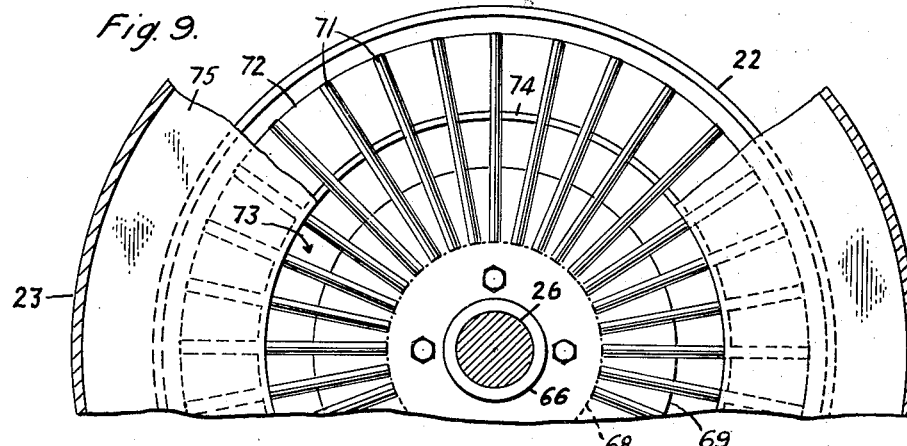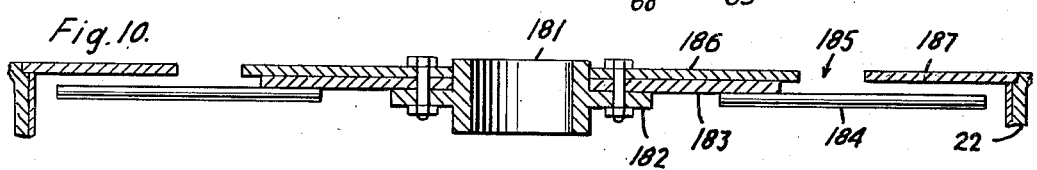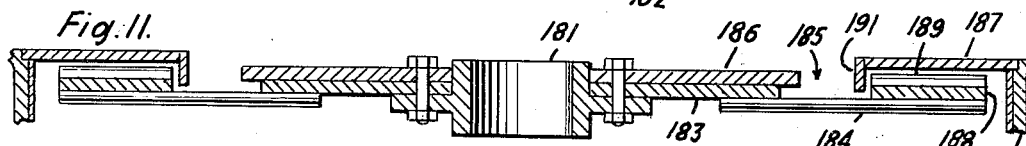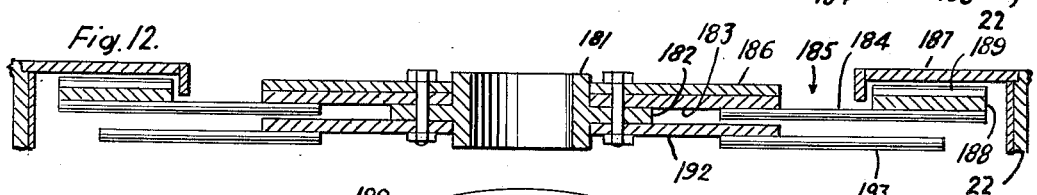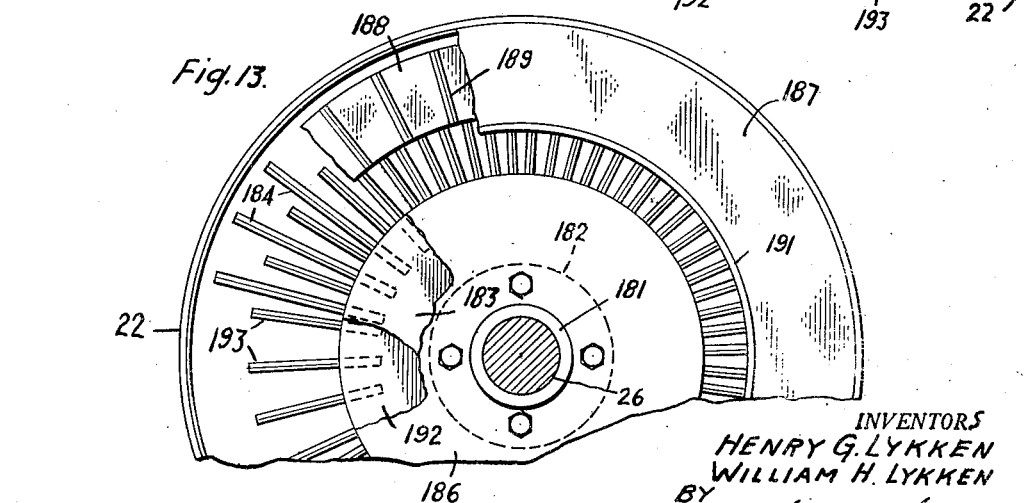

Patented July 24, 1951

2,561,388

UNITED STATES PATENT OFFICE 2,561,388

CLASSIFIER UNITS FOR FRIABLE MATERIAL PULVERIZERS

Henry G. Lykken and William H. Lykken, Minneapolis, Minn., assignors to The Microcyclomat Co., Minneapolis, Minn., a corporation of Delaware Application August 20, 1945, Serial No. 611,512

5 Claims. (Cl. 209—144)

Our invention relates to new and improved constructions of classifier units for use with machines for pulverizing friable materials.

This application is a continuation-in-part of our co-pending application Serial No. 498,988, filed August 17, 1943, now Patent No. 2,497,088, issued February 14, 1950.

In Patents No. 2,294,921 issued September 8, 1942, and No. 2,304,264 issued December 8, 1942, various forms of unitary machines for pulverizing and classifying materials are shown. From time to time improvements have been made in the portion of the machine having to do with pulverizing the materials but in all cases pulverization is by means of a vortex of air- or fluid-suspended material in which reduction in particle size is by impact and attrition of particle upon particle; and in all cases the sufficiently pulverized material is removed from the pulverizing zone by means of a current of air introduced at the bottom of the pulverizing vortex and flowing therethrough in the direction of the axis of the vortex to thereby lift the pulverized material out of the vortex and into an upper classifying zone. In the latter zone the pulverized material has been subjected to a different vortical action and to the same cross current of air by means of which the sufficiently pulverized material has been delivered from the machine and the oversize particles have been rejected and fall by gravity back into the pulverizing zone for further reduction in particle size. One of the great problems in the classifier zone has been to prevent oversize particles from escaping from the machine along with the desired material, thereby spoiling the classification. The improvements described and claimed in the present application are addressed to curing that difficulty, and the same have been used successfully in practice.

Another object of our invention is to considerably simplify the construction of the classifier portion of the machine.

A further object of our invention is to provide a classifier with means to stop stray oversize particles of material from escaping over the top of the rotor therein.

A further object of our invention is to provide classifier mechanism which may be readily changed and adapted to give the same improved results with a wide variety of materials. That is to say, the classifier mechanism has to be rearranged to function properly according to the nature of the material being pulverized and classified, as well as to the desired size of delivered particle. A material which is light in weight and the fractures of the particles of which are definite and more or less uniform in dimensions will require a different classifier mechanism from material even of the same specific gravity but in which the fractures are irregular and the particles are flakelike. Again, the classifier mechanism must be altered according to the different specific gravities of materials and according to the degree of tendency of the particles to cohere or coalesce after pulverization thereof. In fact, every characteristic of a material must be taken into consideration and the classifier mechanism of this application is arranged to be readily adaptable to give uniformly good results with all friable materials.

Because of these variable factors it is not possible to select one embodiment as the best mode of applying the invention. Each is the best mode for its particular material and conditions. By describing several embodiments the principles of the invention are illustrated so that the adaptation thereof will be fully understood.

Heretofore, in most cases, classifier devices have depended upon the action of rotors having blades which are flat-sided and of greater height than width to set up a classifying vortex, especially within the rotor. Such rotors do not create or maintain a wholly smooth and uniform vortex, since each blade moves a quantity of air, proportional to its size, thereby producing an undulating effect in the vortex, and each blade as it passes through the air necessarily produces a vacuum in back of the blade. Air rushes into this vacuum area around the edges of the blade and as a result a considerable number of eddies are created throughout the classification area, all of which conditions disturb the smoothness of the vortex and the classification. For example, oversize material in the vicinity of the rotor blades may be mixed with the desired material and also carried into the eddies and occasionally before the centrifugal effect can eject the oversize, it escapes out of the machine. Our previous designs of classifiers have been improvements over what preceded them and the present invention is a still further improvement.

We have discovered that a more universally applicable classifier producing more uniform results is one in which the classifier rotor, in its simplest form, is made up of equi-spaced round spokes of small diameter, preferably located in juxtaposition to the outlet from the machine and at the top of a free space into which the material to be classified is introduced. Such a rotor sets up a minor centrifugal action within the rotor, and by reason of its high speed creates and maintains a useful vortex of air and suspended material in a region or free space below the rotor. The curved advancing and retreating surfaces of the round spokes create no undulations or eddies which will disturb the vortex action so that the centrifugal action of the vortex will be effective in rejecting a greater percentage of oversize particles. The desired material is withdrawn through the classifier rotor by the suction of a fan, adjusted according to the particle size, etc., of the material, so that the rotor spokes are in effect combing through the air and material at high speed, and the curved advancing faces of the spokes as well as the broad width thereof strike the remaining oversize material and deflect it away from the rotor before it has a chance to escape through the rotor, but the current of air will carry out the material which is of the proper size. As will be explained, the diameter of the spokes may vary slightly, and the number thereof also will be selected according to the delivered particle size. The finer the particle size the greater will be the number of spokes.

Also, stray oversize material heretofore has crept up the wall of the machine and over the top of the rotor, thereby reaching the outlet without being subject to the action of the rotor. In some cases a special sealing ring arrangement will be effective, but we have found the most effective construction generally to be one in which the rotor includes a flared skirt extending downwardly from the edge of the outlet opening and flaring outwardly toward the wall of the casing. Such a skirt, rotating with the high speed rotor, constantly directs a downward current of air and suspended material against the wall of the casing which sweeps the complete circumference of the casing and dislodges any material on the wall, while its angular component forces the material away from the wall where gravity can return the oversize to the bottom of the casing. With this skirt arrangement, no special sealing ring, etc. is needed.

To meet the great variety of conditions in which it is desirable to use these machines, it is at times best to use two or more classifier rotors, either closely spaced and operating as a unit, or spaced apart and operating more or less independently of each other.

Other and further objects of our invention will be understood from this specification taken in conjunction with the accompanying drawings, in which—

Fig. 2 is a central vertical section of a separate classifier unit, according to our invention, which is applicable to other types of pulverizing machines than that illustrated in Fig. 1.

Fig. 3 is a fragmentary view in enlarged detail of the classifier rotor of the devices of Figs. 1 and 2.

Fig. 4 is a similar fragmentary view illustrating one manner of altering the classifier rotor for use with smaller particle sizes than the rotor of Fig. 3.

Figs. 5 and 6 are fragmentary views similar to Figs. 3 and 4 respectively and illustrating one manner of using two classifier rotors operating as a unit.

Fig. 7 is a fragmentary view of another form of double rotor classifier mechanism.

Fig. 9 is a partial plan view of the rotor of Figs. 3 and 4, on the line of 9—9 of Fig. 1 and is illustrative of the plan view of all the rotors.

Fig. 10 is a vertical sectional view illustrating the simplest form of the new classifier rotor.

Fig. 11 is a view similar to Fig. 10 illustrating the application of a special sealing ring which may be used with the rotor of Fig. 10.

Fig. 12 is a view similar to Fig. 11 illustrating another form of double rotor.

Fig. 13 is a partial view in plan of the rotor of Fig. 12.

Figure 1:
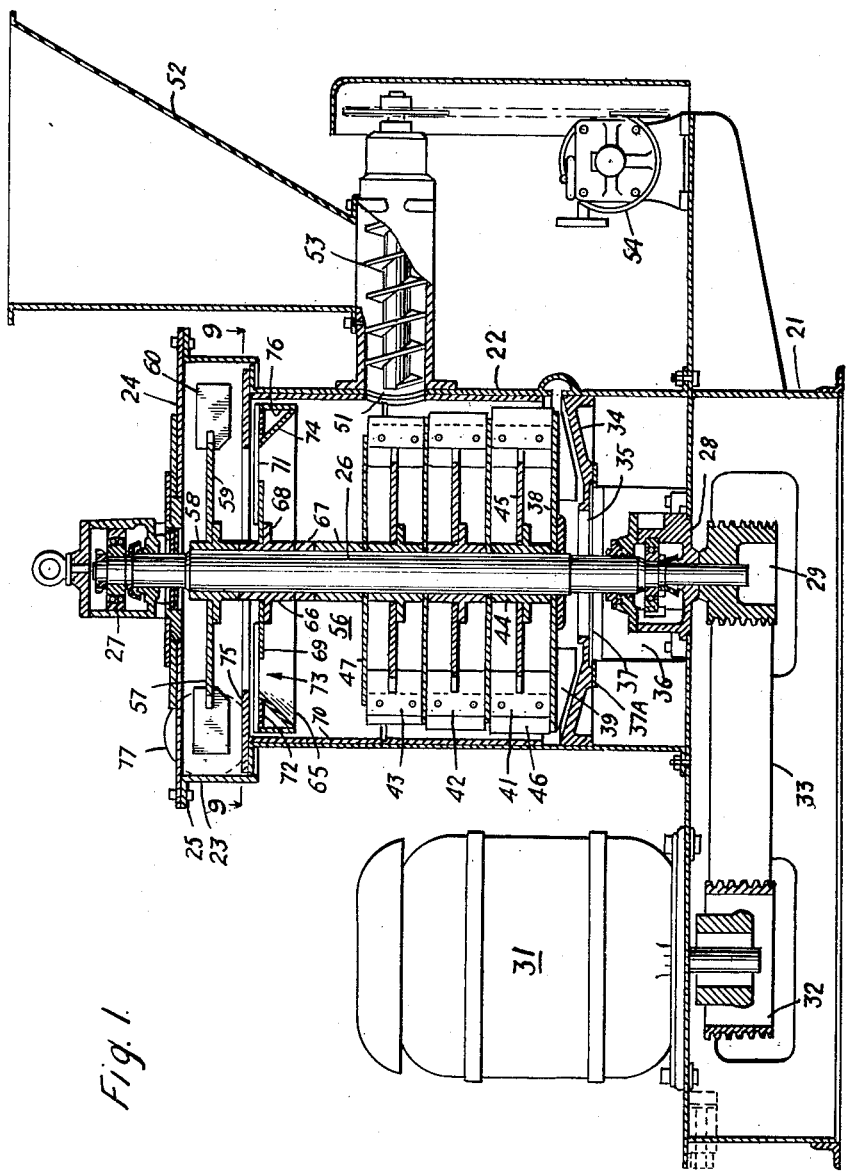
Figure 1 is a central vertical section of a unitary pulverizing and classifying machine constructed according to our invention.

While the details of construction and the mode of operation of the pulverizing mechanism are not claimed in this application, the same will be briefly described for a full understanding of the functioning of the classifier mechanisms, to which this application is directed. Referring to Fig. 1, the base 21 has a cylindrical casing 22 vertically mounted thereon which houses the pulverizing and classifying mechanisms. The cylinder 22 has an enlarged portion 23 at the upper end thereof and is closed by means of a top cover plate 24 which is bolted to the peripheral flange 25 of the enlarged portion of the cylinder. A rotor shaft 26 is centrally mounted in the cylindrical casing 22 so as to rotate in the upper bearing 27 and the lower bearing 28, respectively carried by the cover plate and base. The lower end of shaft 26 extends into the hollow base 21 and there carries a sheave 29 through which the shaft is driven at high speed from the motor 31 that is mounted on the base with its shaft extending thereinto. The motor shaft carries the sheave 32 which is connected to the sheave 31 by driving belts 33.

Spaced above the base 21, the cylinder 22 has mounted therein a dish-shaped member 34, having a central aperture 35, and constituting the floor of the pulverizing chamber. Opening 35 is for the admission of air into the pulverizing chamber and also into the classifier chamber, the air being received from the opening 36 in the side of the cylinder 22, which opening communicates with the space between the base 21 and the floor 34. The volume of air admitted through the opening 35 is controlled in any suitable manner. We have used for this purpose a slide indicated at 37 which is operated from outside the cylinder 22 and moves on guideways 37A to regulate the effective area of the opening 35.

The shaft 26 has a bottom rotor disc 38 fastened thereto which extends horizontally adjacent the floor 34 and is of less diameter than the internal diameter of the cylinder 22. The underside of this disc carries a plurality of short radial fan blades 39 which distribute the incoming air uniformly around the casing, the same entering therein around the periphery of the rotor disc 38.

The pulverizing rotor comprises three superimposed closed-end rotor sections 41, 42 and 43 which are alike in mechanical construction except that in the illustrated embodiment the sections are progressively smaller in diameter. Each section comprises a hub 44 which is keyed to the shaft 26 and to the intermediate flange of which is secured the horizontal disc 45 around the periphery of which are secured a plurality of equispaced vertical rotor blades 46, the radial extent of which is selected according to the desired spacing between the outer edges thereof and the interior wall of the casing, or a liner therefor, as illustrated. Resting on top of each set of rotor blades is an imperforate plate 47 separating the rotor sections from each other, the top plate 47 closing the upper end of the top rotor section and also defining the bottom of the classifier zone.

Each rotor section sets up a pulverizing vortex of air, and suspended material, in the annular space around each rotor. If the number of blades and the width of the annular space is alike in each section, then each will have similar pulverizing characteristics, but the number of rotor blades in each section and the width of the annular space opposite each section can be selected according to the nature of the material being pulverized, to the end that the most efficient operation may be had in each case.

Material to be pulverized is fed into the casing continuously through the opening 51 located at or near the top of the uppermost pulverizing rotor section, the material falling into the pulverizing vortex. The feed of the material is from the hopper 52 by means of the feed screw 53 which is driven from the motor 54, to which it may be connected by sprockets and chain. Any suitable means may be used for regulating the speed of the feed screw to maintain the proper circulating load of air-suspended material in the pulverizing zone.

The air admitted through the opening 35 in the floor of the casing 22 passes vertically through the pulverizing vortex and continuously removes the sufficiently pulverized material therefrom, as rapidly as it is produced. In the illustrated embodiment this material is lifted into the free space 56 immediately above the pulverizing rotor section. The drawing of the air vertically through the pulverizing vortex, and in fact through the classifying rotor about to be described, is by means of the fan 57 located in the enlarged chamber 23 of the casing. This fan comprises a hub 58 keyed to the shaft 26 and carrying horizontal disc 59 around the periphery of which are mounted a plurality of radial fan blades 60. The capacity of this fan is selected according to the size of the particles to be delivered from the machine, and again the various factors of the material must be taken into consideration so that the air current will be properly proportioned, as will be understood. Of course, some oversize material will leave the pulverizing zone and enter the classifier zone, and such oversize must be kept out of the material finally delivered from the machine, the same preferably being returned automatically to the pulverizing zone for further reduction in size.

As explained above, the classifying of the material removed from the pulverizing zone is desirably carried out with some centrifugal action to remove the bulk of the oversize. The classifier comprises the free space 56 at the upper end of which is the classifier rotor, indicated generally by the reference numeral 65. The height of the free space 56 is selective and changes with the material being pulverized and to some extent with the fineness of the particle size. For most materials in which the maximum delivered particle desired is not less than five microns, the free space will be from six to eight inches in height when using a single rotor. The classifier rotor has a hub 66 which is keyed to the shaft 26, and one or more sleeves 67 fit about the shaft 26 according to the desired height of the free space 56, the sleeves resting on top of the top pulverizing rotor plate 47, and the hub 66 of the classifier rotor rests on top of the sleeves 67.

The hub 66 has an intermediate flange 68 on which is secured the ring-shaped plate 69 which, with the flange 68 forms an imperforate center disc closing the center portion of the machine from the passage of material outwardly along the shaft 26 and for a substantial distance radially therefrom. A plurality of equi-spaced round rods or spokes 71 (Fig. 3) are mounted on top of the ring 69 and radiate outwardly therefrom, extending close to the inner wall of the casing 22, or a suitable liner 70 thereon, if one is used. A second ring-shaped plate 72 is mounted on the underside of the spokes 71, the plate 72 extending to and joining the outer ends of the spokes, but being spaced from the perimeter of the inner ring-plate 69 so as to define the annular slot 73, the two plates being concentric. This slot constitutes the outlet opening from the classifier into the fan chamber 23. Our application Serial No. 367,314 filed November 27, 1940, now Patent No. 2,392,331, issued January 8, 1946, is directed to the provision of an annular outlet slot and explains that both the width of the slot and its radial location are selective in accordance with the size of the particle being delivered from the machine. If a wider ring-plate 72A (Fig. 4) is substituted for the one illustrated in Fig. 3, and the inner ring-plate 69 is not changed, the width of the annular slot 73A will be reduced and its effective radial position will be moved inwardly, with which arrangement the maximum particle size passing through the opening will be smaller than with the relative position and width illustrated in Fig. 1. The variation in particle size will depend to a considerable extent upon the internal diameter of the ring-plate 72 which defines the outer edge of the annular slot. The width of the inner ring-plate 69 also may be varied to exercise somewhat similar control but with the rotor as now constructed, this usually is not necessary. In any event, the spokes 71 extend across the annular outlet.

The classifier rotor is augmented by the addition of the annular skirt 74 (Fig. 3) which extends from adjacent the outer edge of the outlet slot 73 downwardly and tapers outwardly close to the inner wall of the casing 22. The angle of the downward taper is preferably about 45°, although it may be varied a few degrees more or less than the 45° angle. Consequently, as the width of the outer ring-plate 72A is increased the depth of the skirt 74A (Fig. 4) becomes greater in order for it to nevertheless terminate adjacent the inner wall of the casing 22, and as will be explained, this is desirable with the smaller particle sizes which will be allowed to pass through the outlet opening 73A. A diaphragm ring 75 is secured to the bottom of the enlarged chamber 23 and extends inwardly of the casing 22, the spokes 71 of the classifier rotor operating in close running clearance therebeneath. It is desirable, but not essential, that the diaphragm ring be of a width so that its internal diameter is the same as that of the ring-plate 72 of the classifier rotor and thus the two inner edges of these elements will be in register, and the ring 75 is readily replaceable.

The functioning of this classifier rotor may be described as follows: The rotor operates at high speed at the upper end of the classifier space and it will cause the air-suspended material to whirl in somewhat of a vortex in the free space 56, the axis of the shaft 26 being the center of the vortex. In this case, however, the rotor 65 produces a smooth, undisturbed vortex action in the free space because the rotor is made up of flat elements which are substantially concentric with the classifying vortex, except for the spokes 71, and they are small in diameter and round. Furthermore, only a relatively small part of each spoke is exposed to the free space through the annular slot 73. The round spoke, presenting a rounded advancing edge, causes very little displacement of the air as it passes therethrough and hence the slight undulations or ripples do not disturb the smoothness of the classifying vortex as a practical matter; and likewise the rounded retreating face of the spoke produces only minor eddies in back of the spoke. Even these minor eddies are displaced above the center line of the spoke because of the action of the fan 57 in withdrawing the air and selected material through the outlet slot 73. Of course, if desired, the spokes 71 could be streamlined in accordance with the air flow, but we have not found that to be necessary in any instance to date. A further contributing factor to the smoothness of the vortex action in the space 56 is that the rotor 65 is located at the top of the space, which is of considerable depth.

It will be appreciated that the vortex in the free space 56 has a lower peripheral speed than the rotor, but the vortex action will eliminate a large part of the oversize material that was introduced therein along with the material which is of the proper size. As the fan 57 withdraws the air and material of proper size through the annular slot 73, the disposition thereof radially outward from the shaft 26 forces a large part of the air and material to move transversely of the outlet slot, and within the depth of the skirt 74 or 74A the centrifugal action is the greatest. Oversize particles will be considerably more affected by this centrifugal action, according to the rule $MV^2$ (M being mass, and V being velocity), to further free the desired material therefrom. Finally, any oversize that is not removed by the vortex action will be met by the spokes 71 which, at high speed, are cutting through the stream of air and material passing through the annular slot 73. By reason of the curved advancing edge and the broad base of each spoke, the stray oversize particles are struck and knocked back into the free space and may be knocked to the wall of the casing. The oversize material eventually reaches the casing wall or wall liner and its speed being there retarded, it falls by gravity back into the pulverizing zone.

As was previously explained, other stray oversize particles tend to move upwardly along the casing wall, especially those that are nearly of the desired particle size, and by reason of the air pressures and movement within the casing, some of these oversize particles heretofore have worked close to the wall and over the top of the classifier rotor, thus entering the fan chamber without passing through the annular slot 73. The addition of the tapered skirt 74 has effectively stopped the upward passage of oversize particles in the space outside the classifier rotor by directing a stream of air from the underside of the skirt, which stream strikes the wall of the casing, along a line immediately below the skirt, and sweeps all particles from the wall at the place of impingement. It is apparent that this is a continuous action so that oversize material tending to enter the space between the edge of the rotor and the casing is continually dislodge and either start- ed downwardly out of the classifier zone or, by reason of the angularity of the air stream leaving the skirt, is moved away from the wall and into the classifier vortex. The smaller the particles to be collected, and the lower the specific gravity of the material, the more difficult it is to separate out the oversize particles which are nearly of the proper size. Thus, the deeper skirt, illustrated at 74A, provides a larger zone of higher speed and greater centrifugal action, and the deeper skirt also gives a stronger downwardly directed stream of air sweeping the wall and sending the oversize back for further pulverization. Likewise with the flakier particles, the stronger downstream is more effective in dislodging the same from the inner wall of the casing and counteracting its tendency to float upwardly.

By a comparison of Figs. 3 and 4, it is believed that the relationships of annular outlet slots and relative depths of the associated skirts will be understood as between that for coarser materials, shown in Fig. 3, and for finer materials, shown in Fig. 4. It is not intended that these figures of the drawings illustrate the limits in the width of the slot or its radial location, or the depth of the rotor skirt. Also, by reference to Fig. 9, the relationship of annular slot and the rotor spokes 71 will be understood.

The rods or spokes 71 most generally will have a diameter of one-quarter inch, but they may be of different diameters, and we have used rods five-eighths of an inch in diameter in very large mills. Also, the number of rods or spokes are selective between sixteen spokes for very coarse material, of the order of two hundred screen mesh, and sixty-four spokes where the delivered particle size is of the order of five microns, or the material is difficult to classify. In most applications thirty-two spokes is found to be satisfactory. The above specifications apply to all forms of classifier rotor described in this application.

The construction of the classifier rotors is completed by the addition of the vertical ring or wall 76 extending between the outer edge of the horizontal ring-plate 72 and the lower edge of the flared skirt, such as 74 or 74A in Figs. 3 and 4. This rotor wall 76 extends parallel to the casing 22 and is spaced only a short distance therefrom. Nevertheless a smooth intense vortex action will be set up in the annular space between the rotor wall 76 and the casing, or its liner, to further aid in keeping oversize from passing behind and over the rotor.

It will be understood that in accordance with the usual practice, the desired material, which is withdrawn through the annular outlet 73 by the fan 57, will be ejected from the machine through the delivery outlet 77 by the action of the same fan. Also, that the fan 57 need not be an integral part of the machine.

The classifier arrangements described in this application are also applicable to other types of pulverizing machinery, or may be used as a classifier unit apart from any pulverizing mechanism. Fig. 2 is illustrative of a classifier unit to be applied to a horizontal type of pulverizer such as is shown in the patent of Henry G. Lykken No. 1,838,560 issued December 29, 1931, for example. In this embodiment, the casing 81 is in the shape of a frustrum of an inverted cone, which is open at its top and bottom and is mounted upon a base frame 82. Extending upwardly from the base frame are a plurality of supporting arms 83 upon which is secured the rotor housing 84 and the fan housing 85. The structure is closed by the cover plate 86 on which is supported the auxiliary housing 87. A rotor shaft 88 is centrally mounted to rotate in bearings 91 and 92 respectively supported by the cover plate 86 and the top of the housing 87. The shaft 88 is rotated at high speed being driven from the motor 93 through the belt and pulley drive indicated at 94.

The classifier rotor, indicated at 95 is mounted in its cylindrical housing 84, the same being keyed to the shaft 88 and extending radially close to the inner wall of the housing 84. The rotor 95 is similar in construction to the rotor 65 described above in connection with Figs. 1, 3 and 4, but may be of any of the constructions indicated in this application. In this case it has been found desirable to secure a deflector plate 96 to the flange 97 of the hub of the rotor, the plate 96 being concentric with the rotor and generally of a diameter slightly larger than the rotor center ring plate 98. Thus, a portion of the deflector plate 96 underlies the annular outlet 99 of the classifier rotor.

Also mounted upon the shaft 88 is the fan 101 which is located in its casing 85 and is arranged of a size and construction to withdraw the material of the desired particle size through the classifier and the annular outlet 99, and also to eject the desired material from the machine to the delivery outlet 102.

The functioning of the classifier rotor 95, with its tapered skirt 103, is exactly as has been described in connection with the rotor 65. That is to say, the material enters the space defined by the casing 81 where it is free to expand and become picked up in the vortex created and maintained by the rotor 95. The oversize will fall through the bottom of the casing 81 and a substantial part of the oversize will be eliminated in the travel of the air-suspended material through the casing 81. The deflector disc 96 aids in the creation and maintenance of the vortex and also aids in increasing the throwout of material within the area defined by the depth of the skirt 103, thus keeping material from directly entering the annular outlet 99. The disc 96 may be varied in diameter according to the difficulties in classifying the material.

In some cases, with material that is difficult to classify, it is advisable to use two rotors, and several variations in the arrangements thereof are illustrated in Figs. 5, 6, 7, and 8.

Referring to Fig. 5, there is shown a classifier rotor comprising a hub 106 which fits upon the rotor shaft 26 and has an intermediate flange 107 to which is bolted the center ring plate 108. On top of the ring plate 108 are mounted the spokes 109 and at the outer extremities thereof is secured the outer ring plate 111, to define the annular slot 112, all as has been described above in connection with Fig. 3. The rotor has a depending outwardly flared skirt 113 similar to the skirt 74 of Fig. 3, except that it will be noted the annular slot is smaller in Fig. 5 and therefore the skirt is longer. Bolted on the underside of the intermediate flange 107 is a ring-shaped disc 114 to the underside of which is secured a plurality of the round rod spokes 115, which extend radially outwardly close to the skirt 113, the outer extremities of the spokes 115 being joined by the hoop 116.

The number of radial spokes 115 in the lower rotor element also may be selected in accordance with the particle size being delivered from the machine and from the nature and characteristics of the material being classified and, preferably, the number of spokes in the lower element will be different from the number of spokes in the upper rotor element. For example, in one embodiment sixty-four spokes have been used in the lower rotor element operating in conjunction with an upper element having only thirty-two spokes. The relationship may be reversed, and there need not be this differential in the number of spokes respectively.

The functioning of the classifier rotor of Fig. 5 is, in principle, the same as that described above in connection with Figs. 1 to 4. The addition of the lower or sub-classifier rotor element increases somewhat the depth and intensity of the classifying vortex both in the free space below the rotor and within the depth of the rotor skirt 113 but primarily the subclassifier rotor with the rounded leading edges and the broad area of its spokes functions to reject oversize particles as described above, after which stray particles will be subjected to the action between the rotor elements and then to a final combing by the spokes of the upper rotor element. It appears to be desirable to space the upper and lower rotor elements with the upper set of spokes 109 above the skirt 113 and the lower set of spokes 115 above the lower edge of the skirt, that is, in the type illustrated in Fig. 5 where the two rotor elements operate as a unit.

Fig. 6 illustrates the same type of double rotor element as shown in Fig. 5 except adapted for the classification of materials of low specific gravity and where delivered particles form a substantially impalpable powder. In this case the classifier rotor comprises a hub 121, keyed to the shaft 26, a center rotor disc 122 secured to the flange of the hub, a plurality of round spokes 123 radiating from the disc 122, an outer rotor disc 124 carried at the extremities of the spokes and defining the annular slot 125, and a downwardly and outwardly flared skirt 126, all similar to the same elements in the rotors previously described herein, except for the angle of the skirt and its offset beneath disc 124. In this case, the annular slot 125 is very narrow and is located radially about midway between the rotor hub and the outer casing, so that the skirt 126 is considerably deeper than in Fig. 5. The lower or sub-classifier rotor comprises a center disc 127 mounted directly upon the shaft 26, and of a diameter substantially the same as the center disc 122, and a plurality of equi-spaced round spokes 128, extending therefrom nearly to the skirt 126, the outer extremities of the spokes being joined by the hoop 129. Mounted upon the flange of the hub 121 so as to be intermediate the two rotor elements is a deflector plate 131 which is of a diameter to extend substantially across the vertical projection of the annular slot 125. Thus, centrifugal action has been added in the space between the rotor elements, but primarily the plate functions to cause the air and material to execute a sharp turn toward the skirt 126 in passing from the first classifier rotor to the second classifier rotor, which deflecting action has been found effective with a few materials that are especially difficult to keep free from oversize particles.

Fig. 7 illustrates another double rotor classifier unit, for use with material having a large surface-to-weight ratio. The rotor unit here comprises a hub 135, keyed to the shaft 26, a center disc 136 secured to flange 137 of the hub 135, a plurality of round spokes 138 radiating from the disc 136 and extending close to the inner wall of the casing, and an outer rotor disc 139, secured to spokes 138, all similar to the single-type classifier rotors heretofore described. While the rotor discs 136 and 139 define an annular opening, in this construction the effective annular outlet slot 141 is defined by the center rotor disc 136 on one side and the diaphragm 75B on the other side. Diaphragm 75B is mounted on the casing 22, and is similar in arrangement and function to the diaphragm 75 of Figs. 1 and 3.

A second rotor element is bolted to the hub flange 137, the same comprising a center rotor disc 143 carrying a plurality of the round equispaced spokes 144 and an outer rotor disc 145 which is concentric with disc 143 and spaced therefrom to define a second annular slot or passage 146, which may be of the same size and radial location as the outlet slot 141, but this need not be adhered to. The length of the spokes 144 and the location of the outer disc 145 are such that an outwardly flared skirt 147 may be carried thereby, the skirt 147 being parallel with and spaced from the skirt 142, which is suitably secured to the ring disc 139 or to the spokes 138 of the upper rotor 141. The location of the second rotor element and the spacing of the skirts may be selected and changed according to the nature of the material, the distance apart of the two rotor elements being regulated by the use of one or more spacer rings 148.

A deflector plate 149 also is mounted upon the flange 137 of the hub 135 so as to be intermediate the two rotor elements. The diameter of this plate also is selective and preferably extends a substantial distance across the projections of the annular slots 141 and 146. The purpose of the deflector plate 149 is to force the material passing through the annular slot 146 to make a sharp turn around the perimeter of the plate 149 in its passage to the annular outlet slot 141, and the disc likewise increases the centrifugal throw-out action in the space between the two rotor elements. The spacing of the plate 149 from the rotor disc 136 is controlled by the size of the spacer ring 151. Lowering the plate 149 to be closer to the lower rotor disc 143 will increase the velocity of the outward flow of air-suspended material and hence of the throw-out force.

It is obvious that with the rotor construction described in Fig. 7, the vortex action in the free space below the rotor elements will be of higher velocity, and that the lower skirt 147 receives its air from the vortex in this free space, directing a current of air outwardly and downwardly against the wall of the casing, and therefore across the space between the lower edge of the skirt and the casing wall or liner. The upper skirt 142 receives its air from the area between the two rotor elements and likewise produces a downwardly directed stream of air sweeping the wall of the casing in the area opposite the bottoms of the two skirts 142 and 147. The velocity of the air will be affected by the spacing between the two skirts, and the depth of the free space below the rotors may be increased several inches.

It also will be noted that the round spokes of the two rotor elements are above and below the space between the two rotors, further reducing the likelihood of disturbances by the rotor elements within the space therebetween. This arrangement is optional but desirable, especially since the round spokes 144 will not materially affect the functioning of the vortex in the space therebelow. Also, the number of the spokes 138 and 144 will be selected in coordination with the particular annular slot, the size particles passing therethrough, and the characteristics of the material being classified.

Figure 8:
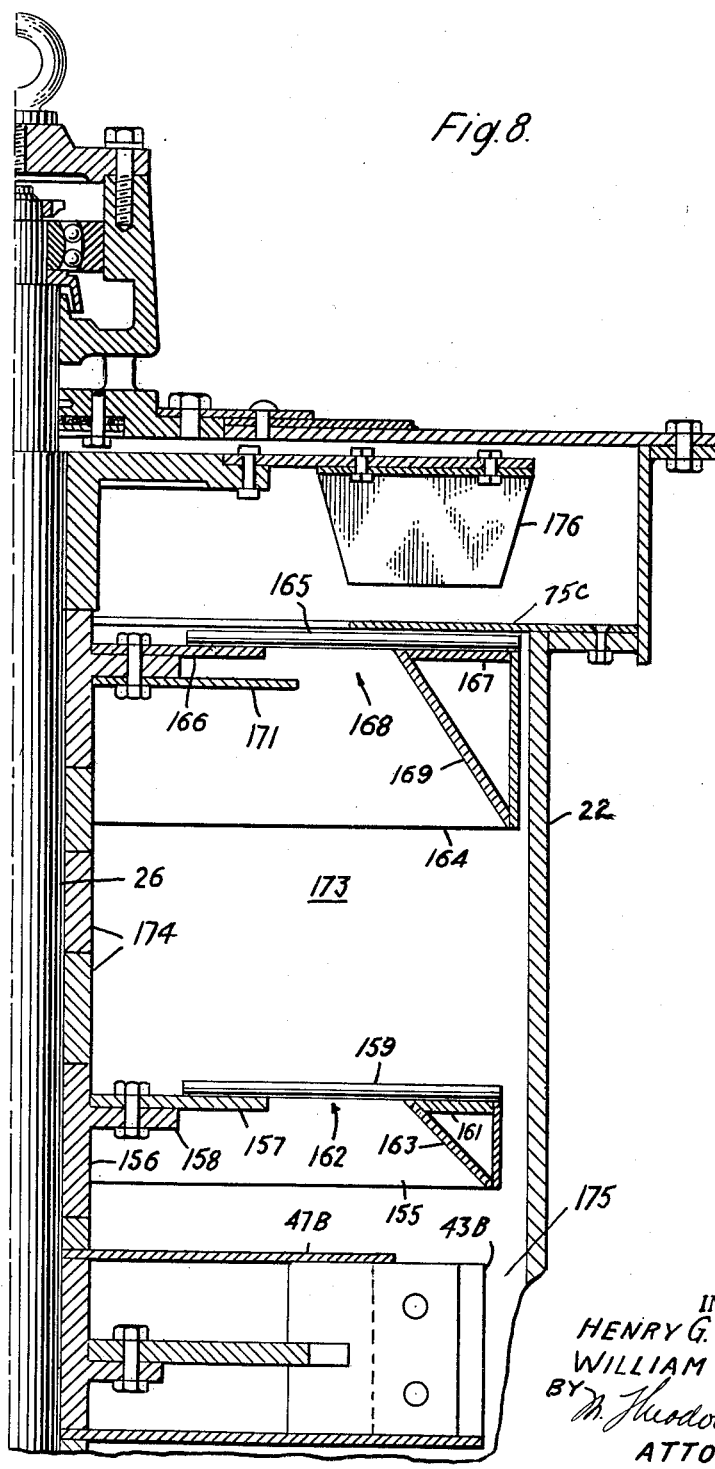
Fig. 8 is a partial vertical sectional view of a unitary pulverizing and classifying mechanism illustrating the use of separated somewhat independently operating classifier rotors of our improved construction.

Fig. 8 illustrates a construction in which two separate rotors, functioning independently of each other, are used in the classifier space. Such an arrangement as here shown is dictated, for example, in cases of materials which have a tendency to rise out of the pulverizing zone before they are sufficiently reduced in particle size as in the case of certain seeds. In this example, the reference numeral 43B indicates the top rotor section of a pulverizing rotor such as indicated in Fig. 1 and corresponds to the rotor section 43 thereof, the same being closed at the top by the rotor plate 47B. The first classifier rotor, indicated at 155, is spaced a few inches above the pulverizing rotor and comprises a hub 156 keyed to the rotor shaft 26, and a center disc 157 bolted to the flange 158 of the hub. The disc 157 has radiating therefrom a plurality of equi-spaced round spokes 159 which carry at the outer end thereof the outer ring-shaped rotor disc 161 which together with the center rotor disc 157 defines the annular slot 162. A depending outwardly flared skirt 163 is secured to the inner edge of the annular slot 162. It will be noted that the classifying rotor 155 is not as large in diameter as the upper classifying rotor, indicated at 164, so that there is a larger annular space between the edge of the rotor 155 and the inner wall of the casing 22.

The rotor indicated at 164 is located at the top of the classifier zone and is somewhat similar in construction to the rotor described in connection with Fig. 2, the same being provided with the radial spokes 165, the discs 166 and 167 and the flared skirt 169, as well as the central deflector plate 171. In the illustration, the annular slot 168 is defined by the disc 166 and by the diaphragm ring 75C, the internal diameter of which is less than that of disc 167. Also the angle of the skirt 169 is reduced and the skirt lengthened. As with all the other top classifier rotors, the rotor elements, including the skirt, terminate close to the wall of the casing 22. The free space 173 between the rotors should be sufficiently large that the rotor actions do not interfere with each other, and usually a space of five or six inches is sufficient, the two rotor hubs being separated by a plurality of sleeves 174 on the shaft 26. In each case, the size and location of the radial slots 162 and 168 and the number of small, round spokes 159 and 165 will be selected in accordance with the principles outlined above.

The material leaving the pulverizing zone, viz. the annular space indicated at 175, will be drawn upwardly by the fan 176 and pass through the annular slot 162 into the free space 173. The classifier rotor 155 will function to eject most of the oversize material by reason of the vortex action between the flat pulverizing rotor plate 47B and the classifier rotor 155 and also within that rotor, as well as by the action of the spokes 159. This oversize material will be thrown to the wall of the casing 22 where its speed will be retarded so that it can fall back into the pulverizing zone, as explained above. The latter action is aided by the stream of air directed downwardly from the flared skirt 163, which downward current of air meeting the air-suspended material as it leaves the pulverizing zone serves to introduce a factor which must be overcome by the rising material, so that in a substantial measure insufficiently pulverized material is prevented from leaving the pulverizing zone.

Whatever material passes the annular slot 162 and the spokes 159 enters the free space 173 and is there subjected to the vortex action set up in that space by the rotors 155 and 164 operating at the top and bottom thereof. Hence, oversize material which escaped the action of rotor 155 is ejected as it proceeds through this vortex. Material making its way to the passage 168 is then subjected to the action of the upper rotor 164, including the action of the deflecting plate 171 and the spokes 165, so that all stray oversize particles are removed from this difficult-to-classify material before the material gets out of the classifying chamber. The skirt 169 of the upper rotor 164 functions as heretofore described for the single rotor, directing a current of air downwardly along the casing wall to prevent oversize particles from escaping over the top of the rotor. The rotor 155 is of smaller diameter than the rotor 164 so that the rotor action will not interfere with the return of the oversize material from the free space 173 into the pulverizing zone 175.

This arrangement of two independently operating rotors functioning in series with each other is very effective, too, in classifying material of extremely fine particle sizes.

Figs. 10 to 13 represent other embodiments of classifier rotors using the round spokes in the rotor which may be used in some applications. Fig. 10 is the simplest embodiment showing a hub 181 which is to be keyed to the rotor shaft 26. The flange 182 on the hub carries a disc 183 on which are mounted a plurality of radial spokes 184 which are round and equi-spaced and small in diameter and extend substantially to the wall of the casing 22, as above described. An annular outlet slot 185 is defined by a rotor disc 186 also secured to the flange 182 and a diaphragm ring 187 mounted upon the wall of the casing 22. As in the previous instances, the number of spokes, and the size and location of the annular slot, will be chosen in accordance with the particle size being selected and the nature and character of the material being acted upon. This form of classifier will have only a few practical applications.

Fig. 11 indicates the rotor of Fig. 10 with a sealing arrangement added which will counteract the tendency of oversize particles to get into the outlet 185 over the top of the classifying rotor without passing therethrough. This sealing arrangement consists of a ring plate 188 mounted on top of the spokes 184 in the area beneath the diaphragm ring 187. A number of short lengths of the round spokes, indicated at 189, are secured on top of this ring plate 188 to operate in close running clearance to the diaphragm 187. The inner edge of the diaphragm 187 is provided with the downturned collar 191 which extends into close running clearance with the spokes 184 and with the inner edges of the ring plate 188 and blades 189 on top thereof. The plate 188 keeps material from passing between the spokes 184 in the area beneath the diaphragm 187, and the blades 189 act as fan blades to prevent the entry of material in the space above the rotor, while the collar 191 additionally serves to seal-off this possible entrance against unwanted oversize material passing into the outlet 185.

Fig. 12 is a view similar to Fig. 11 except for the addition of a sub-classifier rotor element comprising the center disc 192 secured beneath the flange 182 of the hub 181, and carrying radiating therefrom a plurality of the round spokes 193 which extend across the vertical projection of the annular outlet 185 but apparently do not need to extend as close to the cylinder 22 as the spokes 184 of the upper rotor element. Since the two rotor elements are fastened on the same hub they function somewhat as a unit but in the arrangement of Fig. 12, it is preferred that the spokes 193 of the lower rotor element be physically located to appear in the spaces between the rotor blades 184 of the upper rotor element, as indicated in Fig. 13. Thus, as the double rotor rotates, and acts somewhat as a rotary screen, there is much more likelihood of any stray oversize particles being struck by the rotor spokes and deflected away from the annular outlet 185. Again, the number of spokes in each rotor will be chosen according to the delivered particle size and the characteristics of the material.

We have indicated various constructions of mechanisms, and the applications thereof, from which it will be apparent that the assembly of a machine to suit a particular set of conditions can be accomplished readily by bringing together units having features especially adapted for the most efficient pulverization and classification of the particular material being processed. Hence, it may be said that the features disclosed herein may be used independently of each other while, at the same time, if used conjointly they are interdependent to the production of a better pulverizing and classifying mechanism.

We claim:

1. In a classifier for air-suspended pulverized material, a cylindrical casing, an opening in the lower part of said casing for admitting air-suspended pulverized material, an annular outlet at the top of said casing for the outflow of selected material, a shaft, a rotor mounted thereon and operating adjacent said outlet, said rotor comprising a hub, a plurality of radial, equi-distant, round spokes carried by said hub and extending across said outlet, and a depending outwardly flared annular skirt on said rotor, and extending from approximately the outer edge of said annular outlet, a plate mounted on said shaft spaced from said spokes and extending radially to be partially aligned with said outlet, and means for setting up an air current to withdraw sufficient pulverized material through said outlet, while the rotor and plate cause rejection of oversize material in said casing.

2. In a classifier for air-suspended pulverized material, a cylindrical casing, an opening in the lower part of said casing for admitting air-suspended pulverized material, a diaphragm ring at the top of said casing, a rotor mounted in said casing and operating adjacent said diaphragm and comprising a hub, a flat center disc secured thereto, a plurality of equi-distant, round spokes radiating from said disc and extending substantially to the wall of the casing, a flat ring plate carried by said spokes so as to be concentric with and spaced from said center disc whereby to define an annular opening with the radial spokes extending thereacross, a depending outwardly flared annular skirt carried by said rotor in position to direct air therefrom downwardly along the wall of the casing, a second group of radial, equi-distant, round spokes carried by said hub so as to be spaced vertically from the first mentioned spokes, a depending outwardly flared annular skirt carried by the second set of spokes and spaced from the first mentioned skirt, the two groups of spokes being adjustably mounted for vertical displacement whereby to change the spacing therebetween and between said skirts, a deflector plate carried by said hub and extending radially between said annular openings, and means for setting up an air current to withdraw sufficiently pulverized material through said annular openings and past said deflector plate, while the rotor and parts carried thereby cause rejection of oversize material in said casing.

3. In a classifier for air-suspended pulverized material, a cylindrical casing, an opening in the lower part of said casing for admitting air-suspended pulverized material, a diaphragm ring at the top of said casing, a free space therebelow, a shaft extending through said space, a pair of rotors mounted thereon, each rotor comprising a hub, a flat center disc secured thereto, a plurality of equi-distant round spokes radiating from said disc, a flat ring plate carried by said spokes so as to be concentric with and spaced from said center disc whereby to define an annular opening with the radial spokes extending thereacross, a depending outwardly flared annular skirt carried by each rotor in position to direct air therefrom downwardly along the wall of the casing in the area immediately therebelow, one of said rotors operating adjacent said diaphragm and being of larger diameter, and the other of said rotors being spaced from the first mentioned rotor and operating near the bottom of said free space, and means for setting up an air current to withdraw sufficiently pulverized material through said annular openings in succession, while the rotors cause rejection of oversize material in said casing.

4. In a classifier mechanism for pulverized materials, a casing having an outlet at one end thereof, diaphragm means mounted on said casing and extending inwardly to define one side of said outlet, a rotor for operation in said casing and comprising a hub portion, a series of round spokes radiating from said hub and extending along one side of said diaphragm and adjacent thereto and to said casing, outwardly flared skirt means depending from said rods and terminating adjacent said casing, and a ring depending from said rods between the skirt and casing so as to define a narrow passageway between the ring and casing, and means for feeding air and material to said casing and withdrawing selected material through said outlet.

5. In a classifier mechanism for pulverized materials, a casing having an outlet at one end thereof, diaphragm means mounted on said casing and extending inwardly to define one side of said outlet, a rotor for operation in said casing and comprising a hub portion, a disc extending outwardly from the hub and forming with said diaphragm an annular outlet, a series of round spokes radiating from said hub and extending along one side of said diaphragm and adjacent thereto and to said casing, and outwardly flared skirt means depending from said rods and terminating adjacent said casing, a second rotor defining a second annular outlet in said casing and spaced from the first mentioned rotor, a material deflecting plate extending at least part way into the path between said outlets, and means for feeding air and material to said casing and withdrawing selected material through said outlets.

HENRY G. LYKKEN.
WILLIAM H. LYKKEN.

REFERENCES CITED

The following references are of record in the file of this patent:

UNITED STATES PATENTS

| Number | Name | Date |
|---|---|---|
| Re. 20,543 | Crites | Nov. 2, 1937 |
| 227,064 | Sewell | Apr. 27, 1880 |
| 255,890 | Sharpneck | Apr. 4, 1882 |
| 321,108 | Hogeboom et al. | June 30, 1885 |
| 525,095 | Detwiler | Aug. 28, 1894 |
| 1,783,357 | Cook | Dec. 2, 1930 |
| 1,958,816 | Gibson | May 15, 1934 |
| 2,108,609 | O'Mara | Feb. 15, 1938 |
| 2,169,680 | Crites | Aug. 15, 1939 |
| 2,200,822 | Crites | May 14, 1940 |
| 2,294,921 | Lykken | Sept. 8, 1942 |
| 2,304,264 | Lykken | Dec. 8, 1942 |
| 2,329,900 | Hermann | Sept. 21, 1943 |
| 2,350,737 | Eiben | June 6, 1944 |

FOREIGN PATENTS

| Number | Country | Date |
|---|---|---|
| 316,901 | Germany | Dec. 13, 1919 |
| 340,866 | Germany | Sept. 20, 1921 |
| 397,096 | Germany | June 16, 1924 |
| 399,102 | Germany | July 19, 1924 |
| 413,585 | Great Britain | July 19, 1934 |